UNITED STATES PATENT OFFICE.

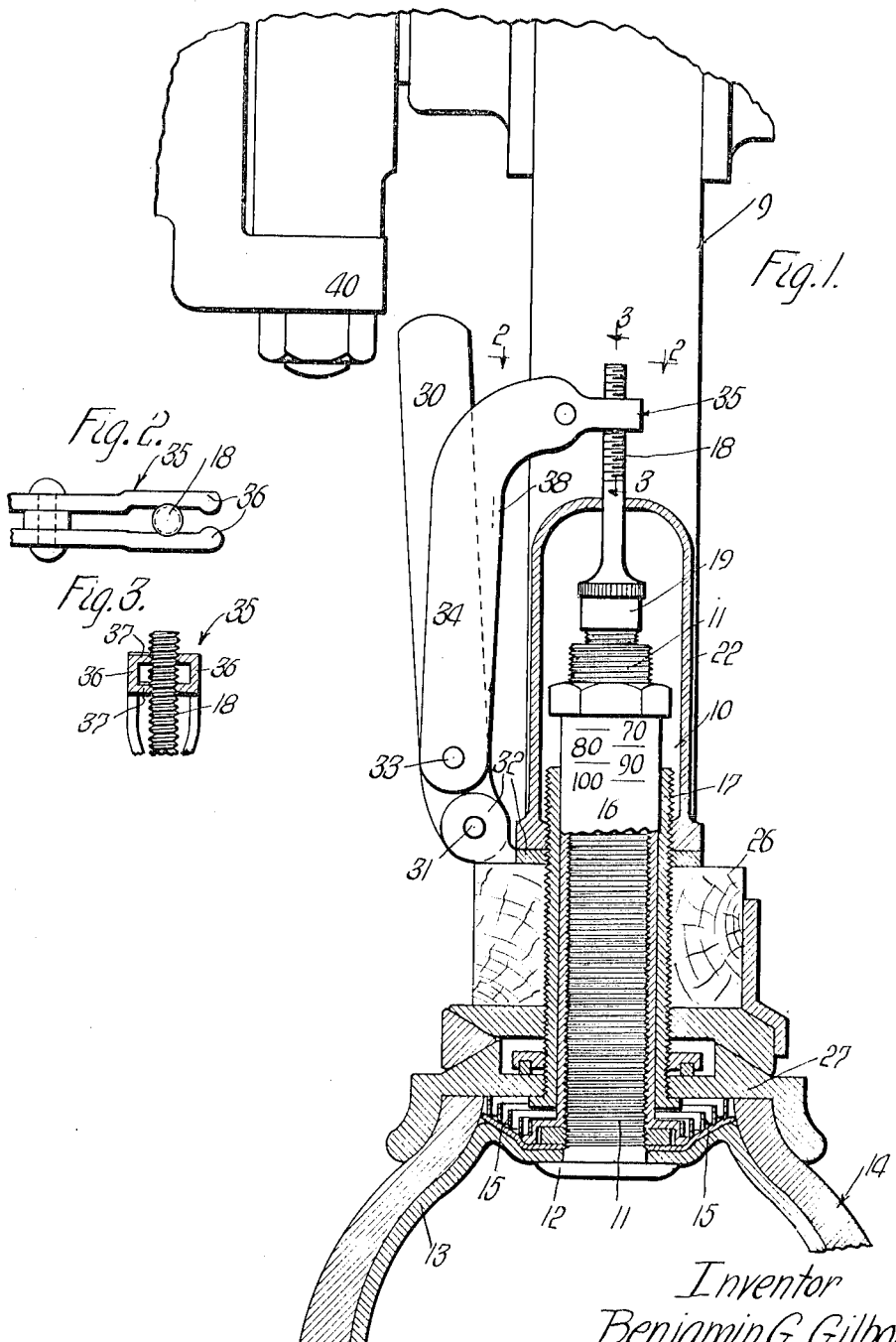

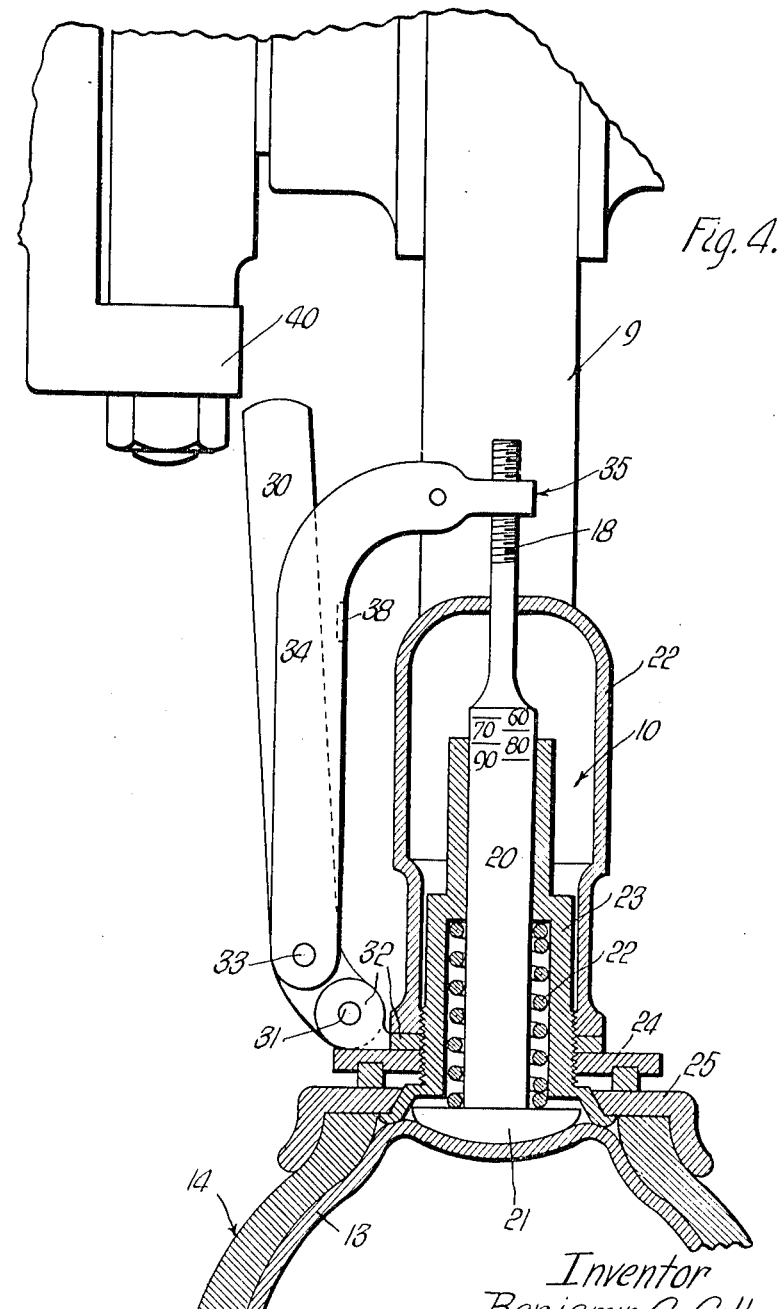

BENJAMIN G. GILBOUGH, OF LOS ANGELES, CALIFORNIA.

TIRE-PRESSURE INDICATOR.

1,309,517.  Specification of Letters Patent.  Patented July 8, 1919.

Application filed May 23, 1917. Serial No. 170,410.

*To all whom it may concern:*

Be it known that I, BENJAMIN G. GILBOUGH, a citizen of the United States, residing at Los Angeles, in the county of Los Angeles, State of California, have invented new and useful Improvements in Tire-Pressure Indicators, of which the following is a specification.

This invention relates to means for indicating tire pressures for inflatable pneumatic tires; and it is an object of this invention to provide a simple and reliable means for indicating, by signal, the fact that a tire is not properly inflated. And it is also an object of this invention to provide the combination of such indicating or signal means with a pressure gage or registering device.

In two applications co-pending herewith I have described generally my invention of pressure gages which continuously show the inflation pressure of a tire; and in this present application I explain my indicator or signal device and also explain its combination with such pressure gages. The whole combination makes a very simple and desirable device whereby the pressure of the tire may be continuously known and whereby a signal will be given immediately if the pressure in a tire falls below the proper point.

I explain a preferred form of my indicating device, and of my complete combination, in the following specification, reference being had for this purpose to the accompanying drawings in which—

Figure 1 is a sectional view of a wheel and tire with my device in operative position thereon; Fig. 2 is a detail view taken as indicated by line 2—2 on Fig. 1; Fig. 3 is a detail view taken as indicated by line 3—3 on Fig. 1; and Fig. 4 is a view similar to Fig. 1 showing a modified combination.

In the drawings I show at 10 such devices as I explain in my said co-pending applications. For instance, in Fig. 1 I show this device 10 including in its combination the usual valve stem 11 secured at 12 to the inner tube 13 of the tire 14. A spring 15 presses the valve stem inwardly into the tire; while the air pressure within the tire, tending to expand the inner tube, presses the valve stem outwardly. The valve stem may be equipped with a sleeve 16 which moves with it, and this sleeve 16 may carry pressure designation markings which are read against the upper end of an outer sleeve 17 in which the sleeve 16 slides. I do not enter further into the details of this structure; it is only necessary to understand that with varying pressure in the tire the valve stem 11 moves in and out, by virtue of the external pressure of the tire.

In this particular form of device I connect my indicator mechanism to a screw threaded rod 18 which is formed as an extension of the valve stem cap 19. In the form of device shown in Fig. 4 this rod 18 is mounted directly upon a plunger 20 which has a foot 21 engaging the exterior surface of the inner tube 13 of tire 14; and a spring 22 presses the foot 21 into the tire against the tire pressure. In each construction the gage or registering device is covered by a cap 22. In the case shown in Fig. 4 this cap 22 screws down on the outer sleeve 23 and screws down onto the nut 24 which holds the outer sleeve in position on the rim 25; and in Fig. 1 the cap 22 screws down onto the wheel felly 26. I have illustrated my device as applied either to a wheel having a felly upon which the demountable rim 27 is mounted, or a wheel which has only the outer rim 25 (as a wire wheel); for the purpose of showing that my device may be applied to any kind of wheel; and I have illustrated two typical forms of devices 10, for the purpose of showing that my indicator may be applied to any such kind of device. In fact, from the broad standpoint of my invention as regards the indicator itself, the devices 10 may be regarded merely as a means to connect the indicator device with the tire, so that the indicating device may be operated by the varying tire pressure. But in the combination herein stated, the device 10 is regarded as a means engaging the tire externally, using the external pressure of the tire, to be moved thereby.

I have illustrated a typical simple form of indicator device; and this may comprise a pivoted arm 30 pivoted at 31 on a small bracket 32 which may be held beneath the cap 22, as illustrated. At 33 there is a pivotal connection between the arm 30 and a connecting member 34. This member extends up and has an upper end portion 35 extending over and arranged to engage the screw threaded rod 18. This upper end portion may be made as illustrated in detail in Figs. 2 and 3, with two parts 36 adapted to springingly engage on opposite sides of the screw threaded rod 18; and each part 36 may have a pair of screw thread engaging portions 37, as is most clearly shown in Fig. 3. The arrangement is such, and the shape of the parts 36 is such, that the member 34 may be disengaged from the screw threaded rod 18 by pulling member 34 to the left in Fig. 1, and may be again engaged with rod 18 by moving member 34 to the right in that figure. When it is desired to pump up the tire, the member 34 is removed from engagement with the rod 18 and the tire is then inflated to the pressure desired. In my combined device this pressure may be observed on the device 10. When the proper pressure is reached, then the indicator device is thrown to the position shown in Figs. 1 and 4, and the member 34 is thrown into engagement with the rod 18; the arm 30 being held in an upright position (about the position shown in the drawings) while the member 34 is engaged with the rod. A stop 38 is provided to limit the movement of signal arm 30 with reference to connecting member 34, to preclude any possibility of the pivots 31 and 33 being thrown out of proper relation; and this stop facilitates the connecting operation just described, for the arm 30 may be thrown against the stop 38 and then both members 30 and 34 moved together while the part 35 is being engaged with rod 18. When the member 34 is thus engaged with the rod, then the arm 30 will be held in the position illustrated; but should the pressure in the tire fall below that to which it was originally inflated, then the rod 18 will move toward the tire and the member 34 will move with the rod, and the pivot 33 will be moved around to the left in Fig. 1 or Fig. 4, causing the arm 30 to be swung out away from the wheel 9 and to such a position that it may strike some stationary part of the vehicle. For instance, this arm 30 may be made so that it will, when thrown outwardly, strike the axle structure at 40. The arm 30 is preferably made of thin spring steel; so that when it strikes the axle structure, or any stationary object, it will vibrate and cause a distinctive noise to be made. This noise, recurring each time the wheel revolves, will call the attention of the driver to the fact that his tire is not properly inflated.

It is not necessary that an audible signal be made; the mere outstanding of the signal arm is sufficient to show the deflation of the tire. The parts may be so proportioned that a change of ten pounds pressure will cause a marked movement of the arm; and it will be noted that this movement always begins from a certain set position—the upright position; because, no matter what the proper inflation pressure may be, the signal arm is always initially set in vertical position for that pressure.

Having described a preferred form of my invention, I claim:

1. In combination with a vehicle wheel and an inflatable tire thereon, a movable pressure operated registering means in operative connection with the tire, and an arm connected to the wheel rim to be moved by movement of said means to project beyond the wheel and strike a stationary part of the vehicle when the tire is not properly inflated.

2. In combination with a wheel and an inflatable tire thereon, a movable pressure operated means in operative connection with the tire, an arm pivoted at one end on the wheel and normally lying approximately in the plane of the wheel, and a connecting member pivoted to the arm and connected to said means to move the arm, the connection between the member and said means embodying a threaded rod on said means and a spring clip on the member adapted to springingly engage the rod at any point along its length.

3. In combination with a wheel and an inflatable tire thereon, a movable pressure operated indicating element in operative connection with the tire, a movable signal member pivoted at one end of the wheel, and means for adjustably connecting the signal member to said element so that for any normal position of said element the signal member may be placed in a certain predetermined position.

4. In combination with a wheel and an inflatable tire thereon, a movable pressure operated element in operative connection with the tire, a movable signal member pivoted on the wheel, and means for adjustably connecting the signal member to said element embodying a threaded rod on said element and a spring clip on said means adapted to engage it.

5. In combination with a vehicle and wheel with an inflatable tire thereon, an element movable by virtue of variation in inflation pressure of the tire, and an audible signal means embodying two coöperating members one of which is mounted on the vehicle and the other of which is movably mounted on the wheel to move therewith and is connected to said element to be thereby moved from its normal position when the tire pressure changes.

6. In combination with a wheel and an inflatable tire thereon, a movable pressure registering means engaging the tire wall to be moved by the expansion of the wall when the tire is inflated, and signal indicator means in operative connection with said pressure registering means.

7. In combination with a wheel and an inflatable tire thereon, a movable pressure registering means engaging the tire wall to be moved by the expansion of the wall when the tire is inflated, and audible indicator means in operative connection with said pressure registering means, embodying an arm connected to and moved by the registering means, and a stationary member on the vehicle of which the wheel is a part adapted to be struck when the tire pressure falls by said arm rotating with the wheel.

8. In combination with a vehicle wheel and an inflatable tire thereon, a movable element engaging the tire wall to be moved by the expansion of the wall when the tire is inflated, and a pivoted arm connected to the movable element and adapted to move when the tire pressure changes to position to strike a stationary part of the vehicle when rotating with the wheel.

9. In combination with a vehicle wheel and an inflatable tire thereon, a stationary sleeve mounted on the wheel rim, a radially movable element carried by the stationary sleeve, one end of said movable element exteriorly engaging the tire wall, a spring confined between the sleeve and element to press the element toward the tire, a pivoted arm connected to said element, the end of the arm being projectible beyond the side of the wheel to strike a stationary part of the vehicle, said arm being of flat spring steel and adapted to vibrate when it strikes.

10. In combination with a vehicle wheel and an inflatable tire thereon, an element movable with relation to the wheel and adapted to be moved by variations of pressure in the tire, a movable indicator member on the wheel, and adjustable connection between the indicator member and the movable element so that the indicator member may be set in a predetermined position in connection with the element in any normal position.

11. In combination with a vehicle wheel and an inflatable tire thereon, an element movable with relation to the wheel and adapted to be moved by variations of pressure in the tire, a movable signal member on the wheel, adapted by movement to move into a position where rotation of the wheel carries it against a stationary part of the vehicle, and adjustable connection between the signal member and the movable element so that when the tire is inflated to any desired normal pressure the signal member may be set in a position where it will not strike such stationary part.

In witness that I claim the foregoing I have hereunto subscribed my name this 12th day of May 1917.

BENJAMIN G. GILBOUGH.